United States Patent
Zises (10) Patent No.: US 8,960,532 B2
(45) Date of Patent: Feb. 24, 2015

(54) CODED BUSINESS CARD ON BADGE

(75) Inventor: Matthew Scott Zises, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/436,743

(22) Filed: Mar. 30, 2012

(65) Prior Publication Data
US 2013/0256399 A1    Oct. 3, 2013

(51) Int. Cl.
*G06F 17/00*    (2006.01)
(52) U.S. Cl.
USPC ............................................. 235/375; 235/380
(58) Field of Classification Search
USPC .................... 235/375, 380; 705/2, 3
See application file for complete search history.

(56) References Cited

U.S. PATENT DOCUMENTS

| | | | |
|---|---|---|---|
| 6,347,301 B1* | 2/2002 | Bearden et al. | 705/5 |
| 7,974,877 B2* | 7/2011 | Ramanathan et al. | 705/14.55 |
| 2002/0032583 A1* | 3/2002 | Joao | 705/2 |
| 2004/0099731 A1* | 5/2004 | Olenick et al. | 235/380 |
| 2005/0045719 A1* | 3/2005 | Yang | 235/385 |

* cited by examiner

*Primary Examiner* — Ahshik Kim
(74) *Attorney, Agent, or Firm* — Schwegman Lundberg & Woessner, P.A.

(57) ABSTRACT

In various example embodiments, a system and method for providing a coded business card on a badge is provided. In example embodiments, a code from the badge of a user is detected. The user data associated with the user based on the code is retrieved. The user data is automatically stored to an address book of a receiving party.

21 Claims, 6 Drawing Sheets

CODED BUSINESS CARD ON BADGE

FIELD

The present disclosure relates generally to data exchange, and in a specific example embodiment, to providing coded information on a badge.

BACKGROUND

Typically, an employee may carry a badge that allows the employee to access certain areas (e.g., secure areas of a work environment). The badge may provide, for example, near field communication (NFC) that exchanges data with a device coupled to a door lock. When the badge is within a predetermined proximity to the device, the badge transmits data to the device which triggers the unlocking of the door.

Employees may also separately carry business cards in order to distribute their contact information. However, the employee may run out of business cards or forget to carry business cards when a need arises to give out a business card.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Example embodiments described herein provide systems and methods for providing a coded business card on a badge. Because many employees have a badge in their possession most if not all of the time, it would be convenient to be able to use the badge as a coded business card. Accordingly, a badge of the employee or user may be captured by a code receiver device. In example embodiments, the code from the badge of a user is detected after being captured by the code receiver device. User data associated with the user based on the code is retrieved. The user data may comprise contact information for the user (e.g., name, address, phone number, e-mail address) or other information associated with the user (e.g., resume). The user data may be extracted directly from the code or be retrieved from a network storage using data extracted from the code. The user data is automatically stored to an address book of a receiving party associated with the code receiver device.

In some embodiments, a determination is made as to whether a calendared event occurs within a timeframe of the code capture or detection. If a calendared event is scheduled within the timeframe of the code capture or detection, the calendared event may be linked to the user data in the address book. This provides context to the receiving party.

Furthermore, some embodiments may handle private data of the user data. In these cases, a determination may be made as to whether access is granted to the private data of the user data. If access is granted, then the private data may be provided (e.g., stored to the address book). If access is not granted, a check may be performed over a predetermined time limit to see if access is later granted.

Figure 1:
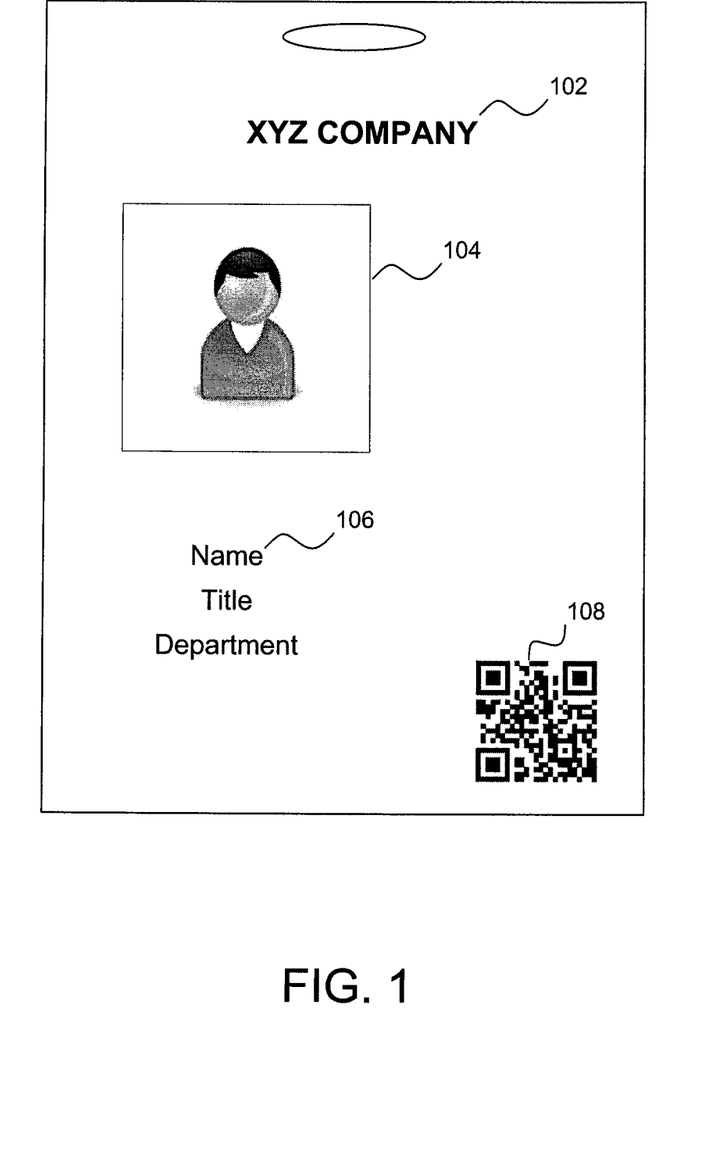
FIG. 1 is an illustration of a badge in accordance with one embodiment.

With reference to FIG. 1, an example of a badge 100 in accordance with one embodiment is shown. The badge 100 is typically an identification badge carried by an employee and used to access various locations within an organization (e.g., building, room). The badge 100 may include visual information such as a name of the organization 102, an image 104 of the employee, and a name 106 of the employee.

In example embodiments, the badge 100 may also comprise a code 108 that stores additional information. The code 108 may be any type of code or matrix that can store information, such as a quick response (QR) code. Alternatively, some embodiments may include a near field communication (NFC) tag, RFID, a bar code, an invisible watermark, or a visible watermark (collectively referred to herein as "code") in the badge 100 that stores the additional information. In example embodiments, the additional information may be business contact information for the employee such as name, phone number, address, e-mail address, website URL, social and business network links (e.g., Facebook® or LinkedIn® links or username) that is collectively referred to as "user data." Essentially, the code on the badge may be used as an electronic business card that provides the user data associated with the code on the badge to a receiving party. The user data may be automatically stored to an address book of the receiving party as will be discussed in more detail below.

Figure 2:
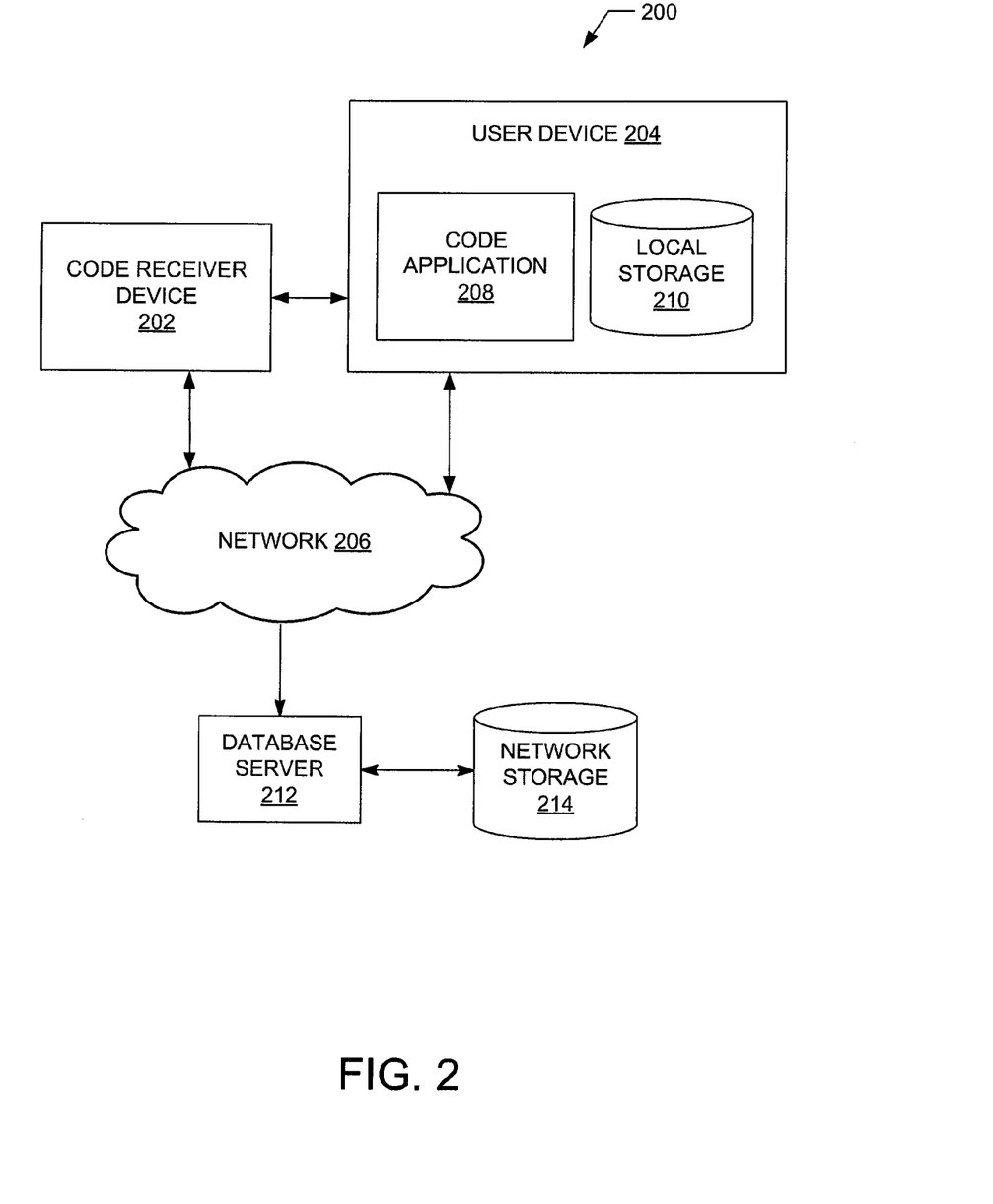
FIG. 2 is a block diagram illustrating an example embodiment of a network architecture used to provide user data from a code on a badge.

Referring now to FIG. 2, an example embodiment of a network architecture 200 used to enable a coded business card on the badge 100 is shown. In example embodiments, a code receiver device 202 is configured to read, scan, capture, or otherwise receive the code 108 that is found on the badge 100. For example, the code receiver device 202 may be a camera that is configured to capture a QR code on the badge 100. Alternatively, the code receiver device 202 may be configured to receive a NFC tag, RFID, a bar code, an invisible watermark, or a visible watermark emitted by, or captured from, the badge 100.

In one embodiment, the code receiver device 202 may be embodied within a user device 204. For example, the code receiver device 202 may be a camera of a mobile phone (e.g., smartphone). Alternatively, the user device 204 may be a desktop computer, laptop computer, or any other communication device that a user may utilize to communicate with the other components within the network architecture 200. In an alternative embodiment, the code receiver device 202 may be a stand-alone device that is coupled to the user device 204 either directly (e.g., wired connection) or via a communication network 206. The communication network 206 may be the Internet, wireless network, cellular network, a Wide Area Network (WAN), or any other network capable of exchanging communications.

The user device 204 comprises a code application 208 and a local storage 210. The code application 208 includes components that detect the code 108, retrieve user data based on the code 108, and store the user data to the local storage 210. The code application 208 will be discussed in more detail in connection with FIG. 3. The local storage 210 may include an address book to which the user data including contact information may be stored. The contact information may include, for example, first name, last name, company name, address, telephone number, e-mail address, fax number, and mobile phone number of a user. The local storage 210 may also store calendar information of a receiving party. Calendar information includes appointments and other calendared events that the receiving party has scheduled.

The network architecture 200 may also comprise a database server 212 facilitating access to one or more information storage repositories or databases (e.g., network storage 214). In one embodiment, the network storage 214 may be a storage device that stores information in a "cloud" for a registered user. In some embodiments, user data for a user may be retrieved from the network storage 214 based on the code 108. Similarly, user data may be stored to the network storage 214 for a receiving party.

Figure 3:
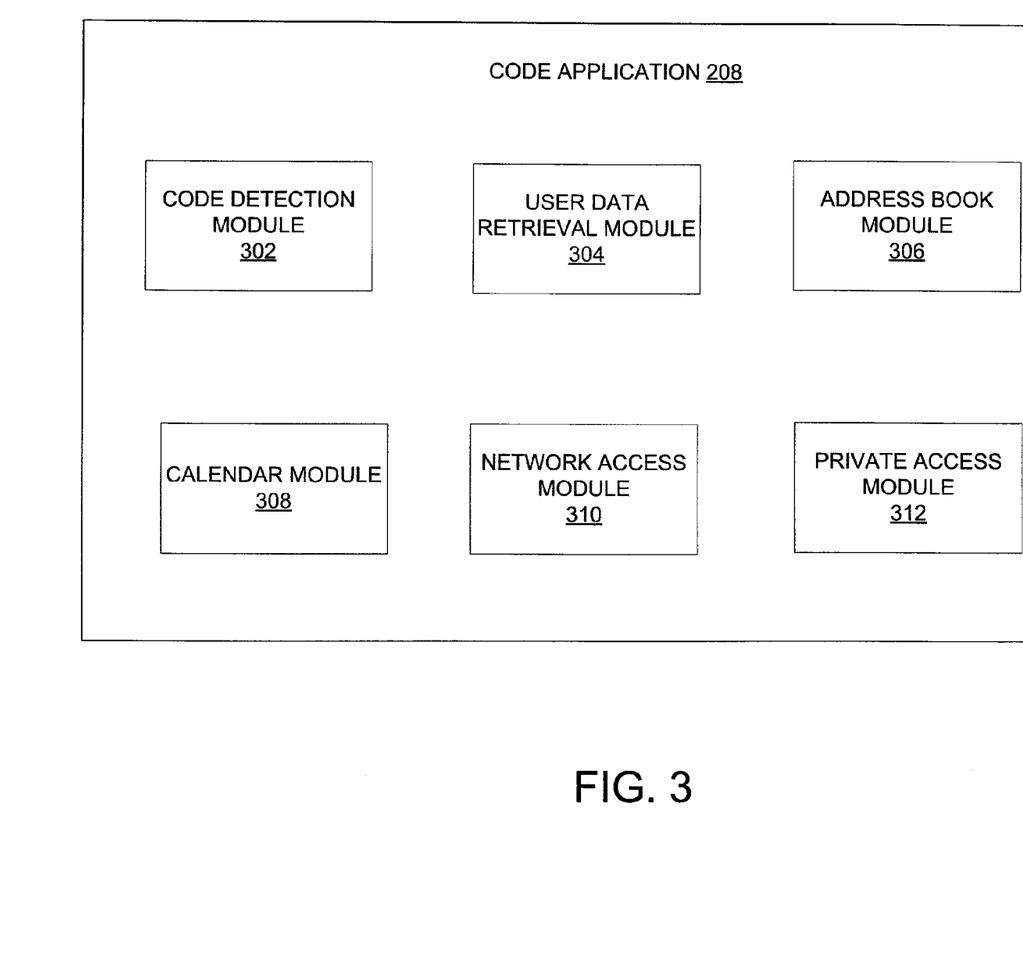
FIG. 3 is a block diagram illustrating an example embodiment of a code application.

Referring now to FIG. 3, the code application 208 is shown in more detail. The code application 208 may comprise a number of modules implemented in hardware, software, or a combination of both. In example embodiments, the code application 208 comprises a code detection module 302, a user data retrieval module 304, an address book module 306, a calendar module 308, a network access module 310, and a private access module 312. While the code application 208 is shown comprising these components, the components of the code application 208 may be distributed between multiple devices. For example, some of the components of the code application 208 may be embodied on the code receiver device 202 while others are embodied on the user device 204.

The code detection module 302 is configured to detect a code from the image or communication captured by the code receiver device 202. Assuming the code is a two-dimensional code or matrix (e.g., QR code), the code detection module 302 will recognize the image of the code and trigger the user data retrieval module 304 to retrieve user data based on the image of the code.

In some embodiments, the user data retrieval module 304 extracts the user data directly from the code. For example, the code may store names, addresses, phone numbers, and e-mail addresses, and hyperlinks (e.g., URLs) which may be extracted by the user retrieval module 304. In other embodiments, the user data retrieval module 304 may extract network data used to retrieve user data from the network storage 214. For example, the user data retrieval module 304 may extract a hyperlink that accesses the network storage 214 to retrieve the user contact information or other information stored at the network storage 214 (e.g., resume). It is noted that some embodiments may use a combination of both direct extraction of user data from the code and retrieval of user data from a network source.

Once the user data is retrieved, the address book module 306 automatically stores the user data to an address book of the receiving party. As such, the user data may be stored to the address book in the local storage 210 or the network storage 214 associated with the receiving party. The address book is a collection of user contact information associated with the receiving party that may be used to access other individuals.

The address book module 306 may cause the user data to be stored in a collated manner (e.g., alphabetically or by date) and in a sortable form. In one embodiment, the vCard standard may be used which is a file format standard for electronic business cards and is represented by a .vcf filename extension. The vCard standard uses vCards such as those attached to e-mail messages or exchanged in other manners, such as via the Internet or instant messaging. The vCards can contain name and address information, phone numbers, e-mail addresses, URLs, logos, photographs, and audio clips. Alternative embodiments may use other formats or standards for managing address books.

The address book module 306 may also record a time that the code is captured by the code receiver device 202 or a time that the code is detected by the code detection module 302. This time may be used by the calendar module 308 to link the user data to a calendared event. That is, the calendar module 308 is configured to determine whether a calendared event occurred within a timeframe of the capturing or detecting of the code. The calendared event may comprise, for example, a meeting at which several participants met and exchanged their information via badges. The timeframe may be, for example, from 10 minutes before the calendared event to 10 minutes after the calendared event. The timeframe may be predetermined and is configurable by any user associated with the address book (e.g., the receiving party or administrator). If a calendared event does occur within the predetermined timeframe, the user data may be linked to the calendared event in the address book. For example, a notation may be provided in the address book that references the calendared event. This allows the receiving party to have context for the user data. In some embodiments, an iCalendar computer file format which allows Internet users to send meeting requests and tasks to other Internet users, via email, or sharing files with an extension of .ics may be used. Alternative embodiments may use other formats or standards for managing calendars.

The network access module 310 accesses the network storage 214 via the database server 212 to retrieve user data stored thereon. For example, the user may store a copy of a resume or their contact information on the network storage 214. The user data retrieval module 304 extracts network data used to retrieve the user data from the code. Using the network data (e.g., a hyperlink) the network access module 310 retrieves the user data from the network storage 214.

The private access module 312 is configured to determine whether access is granted to private data of the user data. For example, the user may have a home phone number or address that the user does not want to automatically give to all receiving parties. Therefore, the user may indicate that the home phone number and address are private data which are provided to receiving parties that are granted access. The user may then indicate which receiving parties are granted access via a private access module of the user (similar to the private access module 312 of the receiving party). The private access module 312 of the receiving party will then determine whether access is granted to the receiving party. If access is not granted, the private access module 312 may periodically check for access grant (e.g., every 2 hours) for a limited amount of time (e.g., for 5 days after the initial capture of the code) to determine if access has been updated by the user. If access is granted, the private data of the user data may be used to update the address book by the address book module 306.

Figure 4:
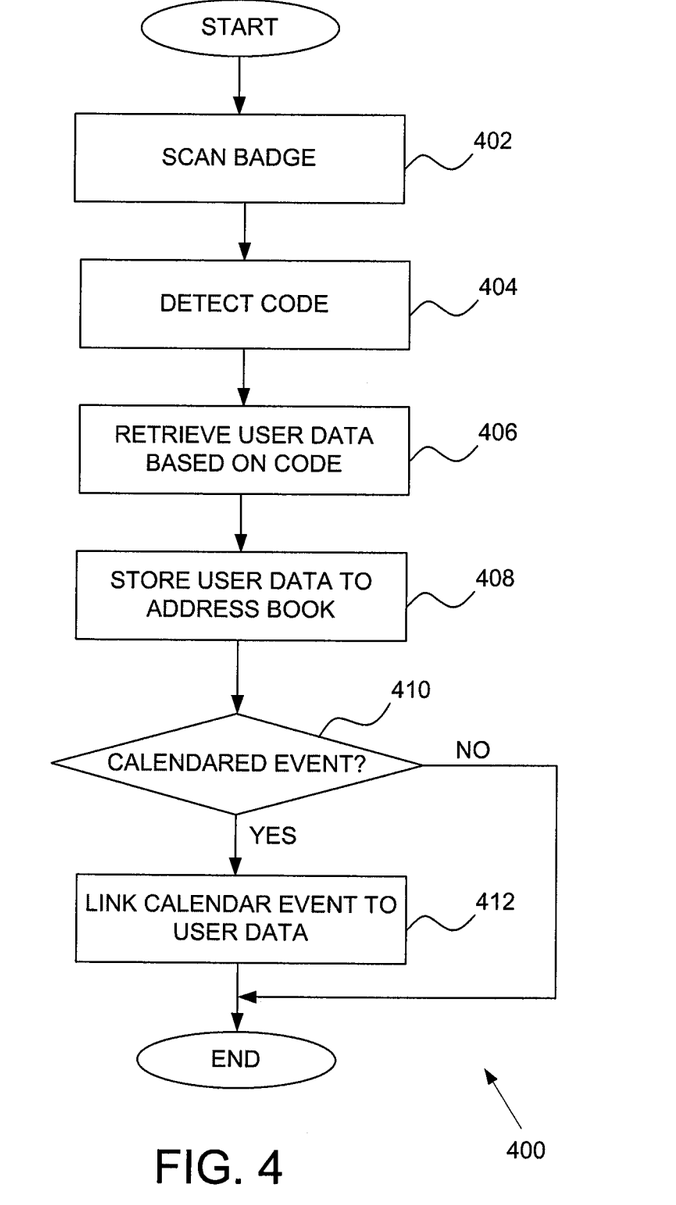
FIG. 4 is a flow diagram of an example high-level method for providing user data based on a code on the badge.

FIG. 4 is a flow diagram of an example high-level method 400 for providing user data based on a coded business card on the badge. In operation 402, the badge may be scanned or otherwise read. The scanning of the badge will enable capture of an image of the code or capture of a NFC tag, RFID, a bar code, an invisible watermark, or a visible watermark (collectively referred to as "code"). The captured code is provided to the code application 208 for analysis.

In operation 404, the code is detected from, for example, the captured image. In example embodiments, the code detection module 302 detects an image of the code. Alternatively, the code detection module 302 may detect a NFC tag, RFID, a bar code, an invisible watermark, or a visible watermark from the code. The code detection module 302 may then trigger the user data retrieval module 304 to retrieve user data based on the code in operation 406. In some embodiments, the user data retrieval module 304 extracts the user data directly from the code. In other embodiments, the user data retrieval module 304 may extract from the code network data used to retrieve user data from the network storage 214. Alternatively, some embodiments may use a combination of both direct extraction of user data from the code and retrieval of user data from a network source.

Once the user data is retrieved, the user data is automatically stored to an address book of the receiving party in operation 408. In example embodiments, the address book module 306 may store the user data to the address book in the local storage 210 or the network storage 214 associated with the receiving party. The address book module 306 may also record a time that the code is captured by the code receiver device 202 or the code is detected by the code detection module 302.

In operation 410, a determination is made as to whether a calendared event occurred within a timeframe of the time of the code capture or code detection. In example embodiments, the calendar module 308 performs this determination. If a calendared event does occur within the predetermined timeframe, the user data may be linked to the calendared event in the address book in operation 412 by the calendar module 308. For example, a notation may be provided in the address book that references the calendared event.

Figure 5:
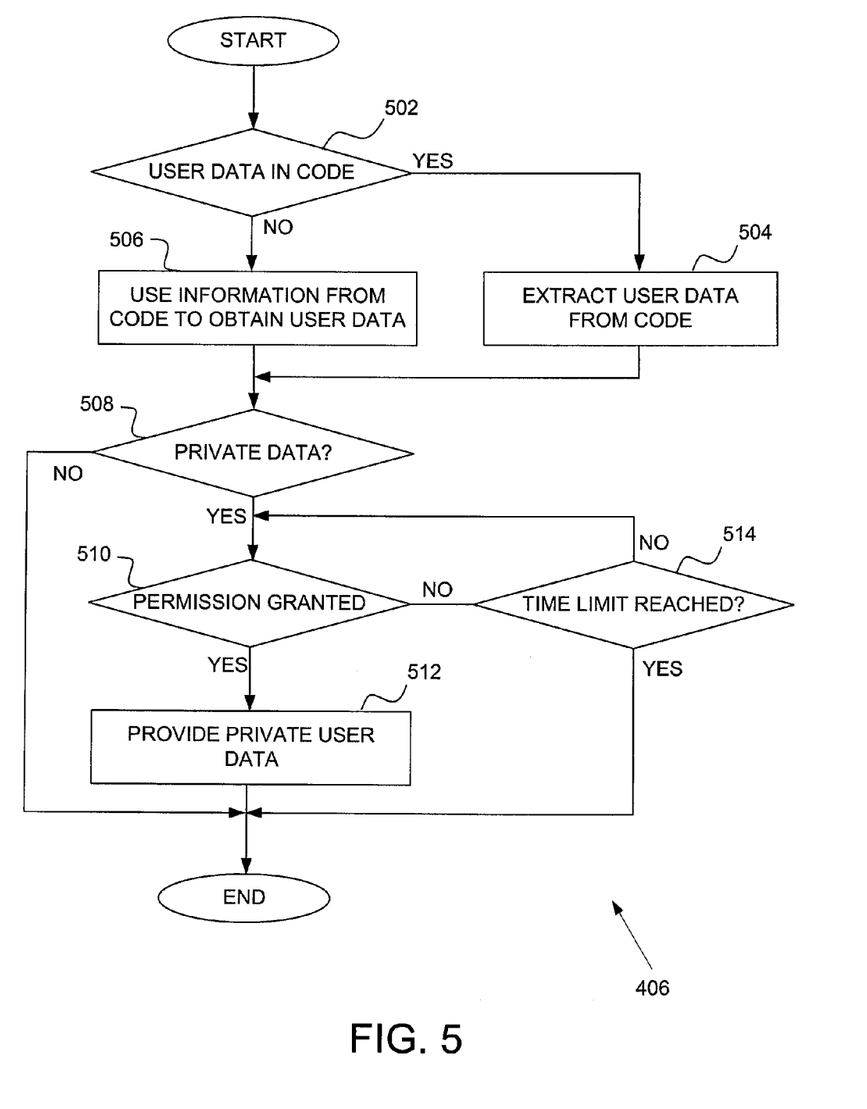
FIG. 5 is a flow diagram of an example high-level method for retrieving the user data based on the code on the badge.

FIG. 5 is a flow diagram of an example high-level method (e.g., operation 406) for retrieving the user data based on the coded business card on the badge. In operation 502, a determination is made as to whether the user data is stored in the code. The user data retrieval module 304 may perform this determination automatically upon the extraction of information from the code.

If the user data is stored in the code, the user data retrieval module 304 will extract the user data directly from the code in operation 504. Alternatively, if the user data is not found directly in the code, then the information extracted from the code is used to obtain the user data in operation 506. For example, the user data retrieval module 304 may extract network data (e.g., hyperlink) used to retrieve user data from the network storage 214. It is noted that in some embodiments, the code may provide both the user data and the network access data. For example, the code may provide the user's name, e-mail address, and phone number, but a resume may only be accessed via a link to the network storage 214.

In operation 508, a determination is made as to whether the user data includes private data. If there is private data, then in operation 510, a determination is made as to whether permission is granted by the user for the receiving party to have access to the private data. In example embodiments, the private access module 312 is configured to determine whether access is granted to private data of the user data. If access is granted, then in operation 512, the receiving user is provided access to the private data. For example, the private data may be automatically saved to the address book of the receiving party.

In some cases where access is not granted, the private access module 312 may periodically check for access grant (e.g., every 3 hours) for a limited amount of time (e.g., for 3 days after the initial capture of the code) to determine if access has been updated by the user in operation 514. Once the time limit is reached and there is no access granted, then the process ends and the receiving user will not have access to the private data portion of the user data.

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations as described herein. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time. The processor may be temporary configured or permanently configured to perform relevant operations. Whether temporarily configured or permanently configured, such processors may constitute processor-implemented modules that operate to perform one or more operations or functions.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Medium

Figure 6:
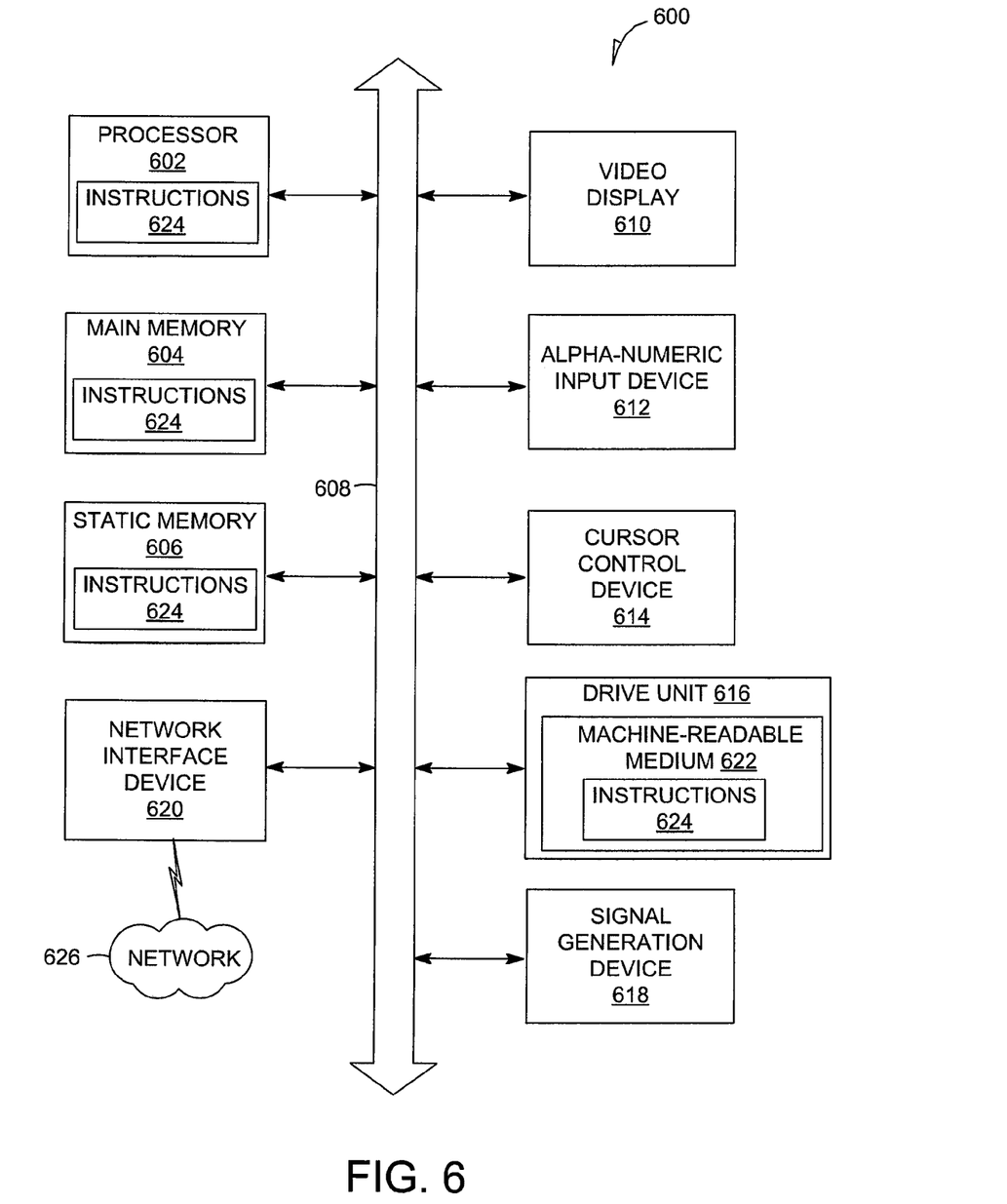
FIG. 6 is a simplified block diagram of a machine in an example form of a computing system within which a set of instructions for causing the machine to perform any one or more of the methodologies discussed herein may be executed.

With reference to FIG. 6, an example embodiment extends to a machine in the example form of a computer system 600 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 may include a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). In example embodiments, the computer system 600 also includes one or more of an alphanumeric input device 612 (e.g., a keyboard), a user interface (UI) navigation device or cursor control device 614 (e.g., a mouse), a disk drive unit 616, a signal generation device 618 (e.g., a speaker), and a network interface device 620.

Machine-Readable Storage Medium

The disk drive unit 616 includes a machine-readable storage medium 622 on which is stored one or more sets of instructions 624 and data structures (e.g., software instructions) embodying or used by any one or more of the methodologies or functions described herein. The instructions 624 may also reside, completely or at least partially, within the main memory 604 or within the processor 602 during execution thereof by the computer system 600, with the main memory 604 and the processor 602 also constituting machine-readable media.

While the machine-readable storage medium 622 is shown in an example embodiment to be a single medium, the term "machine-readable storage medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 624 may further be transmitted or received over a communications network 626 using a transmission medium via the network interface device 620 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Additionally, although various example embodiments discussed above focus on a coded business card on a badge, the embodiments are given merely for clarity in disclosure. Thus, any encoding of information for retrieval and automatic storage to a receiving party's storage device may be considered as being within a scope of example embodiments. Each of a variety of example embodiments is discussed in detail below.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A system comprising:
a code receiver device configured to capture a code from a badge of a user;
a code detection module configured to detect the code from the badge of the user;
a user data retrieval module configured to retrieve user data associated with the user using the code detected from the badge; and
an address book module configured to automatically store the user data retrieved using the code detected from the badge to an address book of a receiving party.

2. The system of claim 1, further comprising a calendar module configured to determine a calendared event that occurs within a timeframe of the detecting of the code and to link the calendared event to the user data in the address book.

3. The system of claim 1, further comprising a private access module configured to determine whether access is granted to private data of the user data and to provide the private data of the user data based on the access being granted.

4. The system of claim 1, wherein the user data is retrieved from network storage using the code that is detected.

5. The system of claim 1, wherein the user data retrieved using the code detected from the badge comprises a resume.

6. A tangible machine-readable storage medium having no transitory signals and storing instructions which, when executed by at least one processor of a machine, cause the machine to perform operations comprising:
detecting a code from a badge of a user;
retrieving user data associated with the user using the code detected from the badge;
automatically storing the user data retrieved using the code detected from the badge to an address book of a receiving party;
determining a calendared event that occurs within a timeframe of the detecting of the code; and
linking the calendared event to the user data in the address book.

7. The tangible machine-readable storage medium of claim 6, wherein the retrieving comprises:
determining whether access is granted to private data of the user data; and
providing the private data of the user data based on the access being granted.

8. The tangible machine-readable storage medium of claim 6, wherein the retrieving of the user data comprises identifying the user data that is embedded in the code.

9. The tangible machine-readable storage medium of claim 6, wherein the retrieving of the user data comprises:
accessing a network storage device; and
retrieving the user data stored on the network storage device.

10. The tangible machine-readable storage medium of claim 6, wherein the user data retrieved using the code detected from the badge comprises a resume.

11. A method comprising:
detecting a code from a badge of a user;
retrieving, by at least one processor of a machine, user data associated with the user using the code, the retrieving comprising:
determining whether access is granted to private data of the user data, and
providing the private data of the user data based on the access being granted; and
automatically storing the user data retrieved using the code detected from the badge to an address book of a receiving party.

12. The method of claim 11, further comprising:
determining a calendared event that occurs within a timeframe of the detecting of the code; and
linking the calendared event to the user data in the address book.

13. The method of claim 11, wherein the user data comprises contact information of the user.

14. The method of claim 11, wherein the user data retrieved using the code detected from the badge comprises a resume.

15. The method of claim 11, wherein the retrieving of the user data comprises identifying the user data that is embedded in the code.

16. The method of claim 11, wherein the retrieving of the user data comprises:
accessing a network storage device; and
retrieving the user data stored on the network storage device.

17. The method of claim 11, further comprising capturing the code from the badge.

18. The method of claim 17, wherein the capturing of the code comprises capturing an image of the code with a code receiver device.

19. The method of claim 17, wherein the capturing of the code comprises receiving a near field communication from the badge.

20. An identification badge comprising:
a card having information of a user; and
a code that triggers retrieval of user data that is automatically stored to an address book of a receiving party when detected by a code receiver device associated with the receiving party, the user data including private data based on a determination that access is granted to the private data.

21. The identification badge of claim 20, wherein the user data retrieved using the code detected from the badge comprises a resume.

* * * * *